Jan. 6, 1959     E. SORENSEN     2,867,328
DISPOSABLE WATER FILTER ATTACHMENT
Filed Oct. 30, 1956
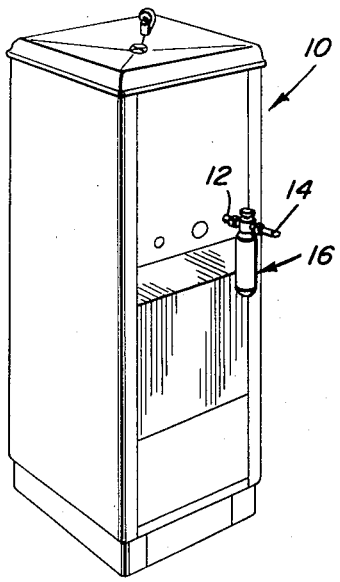
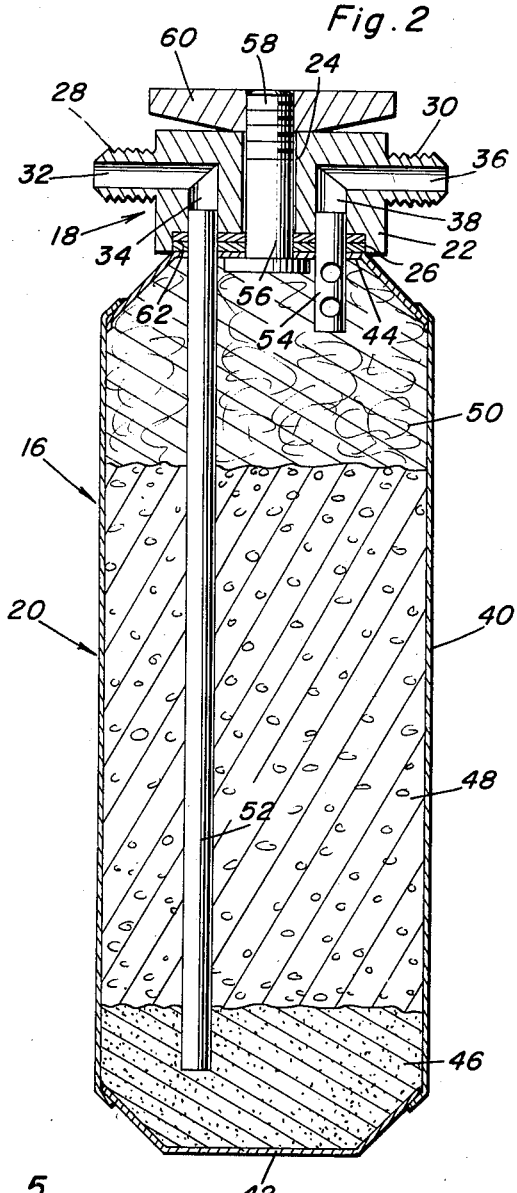
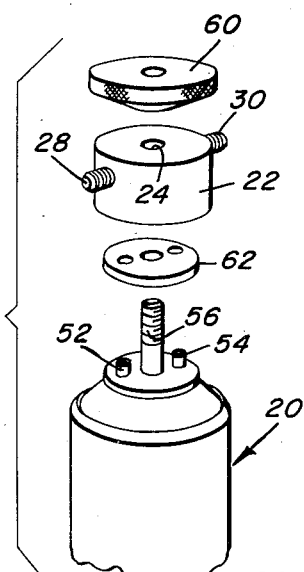
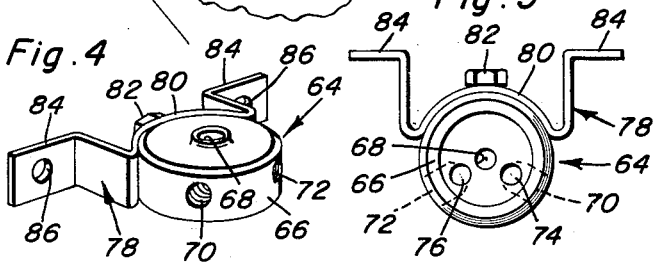
Egon Sorensen
INVENTOR.

United States Patent Office 2,867,328
Patented Jan. 6, 1959

2,867,328

DISPOSABLE WATER FILTER ATTACHMENT

Egon Sorensen, Glen Riddle, Pa., assignor to Sunroc Corporation, Glen Riddle, Pa., a corporation of Pennsylvania Application October 30, 1956, Serial No. 619,287

4 Claims. (Cl. 210—282)

This invention relates in general to new and useful improvements in filters for liquids, and more specifically to an improved filter of the disposable type, which filter includes its own disposable cartridge.

Filters for removing foreign matter from liquids are in universal use. However, all such filters have the disadvantage in that they cannot be quickly replaced with a minimum of effort. Further, present day filters normally of the type which include a permanent casing and which requires the removal of the top of such casing for the insertion of a new cartridge element. The old cartridge element is filled with the foreign matter which it has removed and in itself is undesirable and unclean to handle. Further, unless precautions are taken to clean the casing, all of the foreign matter removed by the old filter will not be removed from the system and the new filter will soon begin to clog.

It is therefore the object of this invention to provide an improved replaceable filter of a type which includes a cartridge whereby the entire filter unit including the cartridge is removed so that all foreign matter previously removed by the filter is removed from the system and the filter unit is replaced by an entirely new clean unit.

Another object of this invention is to provide an improved filter unit which includes a cartridge having disposed therein suitable filter means, the cartridge and the filter means being removable and replaceable as a unit whereby the existence of a dirty and undesirable filter element is eliminated and the old filter unit is suitable for handling prior to disposal.

Although filters are normally associated with liquids, such as oil and the like for internal combustion engines, etc., in many localities it is desirable that the drinking water be first filtered. In view of this, it is desirable that filters be placed on water fountains, soft drinking dispensing machines and other machines. Since such machines are placed in exposed locations and since it is highly desirable that the filter elements have a pleasing appearance and that there be no spillage of dirt and the like when the filter elements are replaced, it is desirable that the filter elements be in the form of self-contained units which are replaced in their entirety.

It is therefore still another object of this invention to provide an improved filter assembly which is self-contained and which is so constructed whereby it may be placed in existing water lines and the like for the purpose of removing foreign matter and other impurities from the water with the filter unit being so mounted whereby it may be changed without causing any unsightly conditions.

Another object of this invention is to provide an improved disposable filter unit, the filter unit being so mounted whereby it may be quickly removed and replaced without requiring any tools whatsoever so that the changing of the filter may be readily expedited by both repairmen and home owners.

Another object of this invention is to provide an improved filter attachment for use in conjunction with disposable filter units, the filter attachment being in the form of a fitting having inlet and outlet passages receiving inlet and outlet tubes of a filter cartridge and being provided with a suitable fastener for retaining the filter cartridge in place with respect to the fitting whereby the removal and replacement of a single fastener facilitates the changing of the filter cartridge.

Still another object of this invention is to provide an improved disposable filter unit, the filter unit including a cartridge, the cartridge being provided with a supply line and an outlet line, the lines terminating within the cartridge, there being disposed within the cartridge filtering elements, the filtering elements varying depending upon the desired characteristics of the filter unit.

Yet another object of this invention is to provide an improved filter attachment in the form of a mounting fitting or manifold, the filter attachment being provided with a simple removable filter unit including a removable casing, the filter unit being so connected to the fitting or manifold so that it may be quickly replaced when desired.

A further object of this invention is to provide an improved filter attachment for fluid lines, the filter attachment including a mounting fitting or manifold mountable in a fluid line, and a removable filter unit, the fitting and the filter unit being so constructed whereby fluid freely passes through the filter attachment in such a manner that channeling, blocking, and excessive restrictions are not likely to occur.

A still further object of this invention is to provide an improved mounting attachment for removable filter units, the mounting attachment including a mounting fitting or manifold so constructed whereby a single fastener both holds the unit in place and retains the filter unit in sealed relation with respect to the mounting fitting whereby removal and replacement of a filter unit is greatly facilitated.

Yet a further object of this invention is to provide an improved disposable filter attachment for liquids, the filter attachment including a mounting fitting and a disposable filter unit, the disposable filter unit being secured to the mounting fitting by means of a threaded fastener having a hand wheel type nut and having suitable fittings connected to the mounting fitting facilitating the entrance and escape of water.

A further object of this invention is to provide an improved disposable filter cartridge which includes a disposable container having mounted therein suitable filtering layers including a lower granular layer, an intermediate activated carbon layer of a relatively great extent and an upper fibrous layer, the layers providing for complete filteration of water passing through the disposable cartridge.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a water fountain having mounted on the rear part thereof the disposable water filter attachment which is the subject of this invention;

Figure 2 is an enlarged vertical sectional view taken through the water filter attachment and showing it removed from the water fountain;

Figure 3 is an enlarged perspective view showing the various elements of the water filter attachment and the manner in which they are releasably connected together, only the upper part of the disposable cartridge being illustrated;

Figure 4 is an enlarged perspective view of a modified form of mounting fitting and shows the specific details thereof; and Figure 5 is an enlarged plan view of the mounting of Figure 4 and shows further the details thereof.

Referring now to the drawings in detail, it will be seen that there is illustrated a conventional type of water fountain which is referred to in general by the reference numeral 10. The water fountain 10 includes an inlet pipe 12 through which water passes into the water fountain 10. There is also provided a water supply pipe 14. Disposed intermediate the water supply pipe 14 and the inlet pipe 12 is the disposable water filter attachment which is the subject of this invention, the water filter attachment being referred to in general by the reference numeral 16.

The water filter attachment 16 includes a mounting fitting which is referred to in general by the reference numeral 18 and a disposable cartridge which is referred to in general by the reference numeral 20. The mounting fitting 18 includes a generally solid cylindrical body portion 22 having a central bore 24 therethrough and an undercut in the underside thereof forming a recess 26. Formed integral with the body portion 22 and extending outwardly therefrom in diametrically opposite relation is an inlet connection 28 and an outlet connection 30. The connections 28 and 30 are connected to the pipes 14 and 12, respectively.

Extending radially through the inlet connection 28 is an inlet passage 32 which has communicated therewith a vertical portion 34 which opens through the bottom of the body member 22 into the recess 26. The outlet connection 30 includes an outlet passage 36 which is communicated with a vertical portion thereof, the vertical portion being referred to by the reference numeral 38 and opening through the bottom of the body member 22 into the recess 26.

The disposable cartridge 20 includes a disposable container 40 which may be formed of any suitable waterproof material. The container 40 may be formed of a number of parts or may be of a one-piece construction, as desired. The container 40 includes a bottom wall 42 and a top wall 44.

Disposed within the container 40 is a lower layer of granular material, preferably sand, the lower layer being referred to by the reference numeral 46. Also disposed within the container 40 is a relatively deep intermediate layer 48 which is composed of activated carbon. Overlying the intermediate layer 48 is an upper layer 50 which is formed of fibrous material, such as cotton.

Extending down through the top wall 44 and through the layers 50 and 48, and into the layer 46 is an inlet fitting 52. An outlet fitting 54 extends down through the top wall 44 into the upper layer 50.

In order that the cartridge 20 may be removably secured to the mounting fitting 18, there is provided an elongated fastener 56 which is anchored with respect to the top wall 44 and extends up therethrough. The fastener 56 includes a threaded upper portion 58 on which there is threadedly engaged a hand wheel 60. The fastener 56 passes through the bore 24 and the hand wheel type nut 60 permits the rigid connection of the cartridge 20 to the mounting fitting 18 without the use of any tools.

In order that flow of water through the cartridge 20 is permitted, the inlet fitting 52 extends up into the vertical portion 34 of the inlet passage 32. Also, the outlet fitting 54 extends up into the vertical portion 38 of the outlet passage 36. In order to provide a suitable seal, there is disposed between the body member 22 and the top wall 44 a suitable gasket construction 62. The gasket construction is disposed primarily within the recess 26.

Referring now to Figures 4 and 5 in particular, it will be seen that there is illustrated a modified form of mounting fitting which is referred to in general by the reference numeral 64. The mounting fitting 64 includes a body member 66 which is generally cylindrical in outline and which is substantially solid. Extending through the body member 66 is a bore 68 for receiving the fastener 56. Opening through vertical portions of the body member 66 are internally threaded passages 70 and 72, the passage 70 being an inlet passage and the passage 72 being an outlet passage. The passage 70 includes a vertical portion 74 which opens down through the bottom of the body member 66. The passage 72 includes a vertical portion 66 which also opens through the bottom of the body member 66.

In order that the body member 66 may be conveniently mounted, there is provided a mounting bracket 78. The mounting bracket 78 includes an intermediate arcuate portion 80 which closely abuts the body member 66 and is secured thereto by a fastener 82. Disposed outwardly of the arcuate portion 80 are mounting flanges 84 having apertures 86 for receiving suitable mounting fasteners (not shown).

From the foregoing description of the preferred embodiment of the above invention, it will be readily apparent that there has been devised a desirable disposable filter unit which is so constructed whereby it functions as a complete filter for water or other liquids so that it is merely necessary to mount the mounting fitting for the filter unit in the supply line for machines of all types including those using a water source, such as water fountains. Also, not only is the filter unit relatively inexpensive and disposable, but also the filter unit is so supported from the mounting fitting whereby it may be removed and a new filter unit positioned without requiring any tools whatsoever, the entire filter unit being connected to the mounting fitting and sealed with respect thereto through the use of a single hand wheel type nut.

It is to be understood that the particular connection between the filter unit and the mounting fitting is merely a preferred embodiment of the invention. If desired, other types of mounting fittings may be utilized and the construction of the upper end of the filter unit may be varied to fit the particular mounting fitting. It is not intended that the present invention be limited to a specific type of filter element and its specific connection with a mounting fitting. It is readily understandable that the filter unit could be made to be mounted on all types of mounting fittings or manifolds and that one of the basic features of the present invention is the making of the filter unit as a complete disposable unit including the casing thereof.

Further, although a specific type of filter media has been illustrated and described with respect to the filter unit, it is to be understood that this invention is not limited to a particular type of filter element or unit and that the contents thereof may be varied depending upon the particular type of liquid which is to filtered and the type of foreign matter to be removed therefrom. Therefore, while it is desired that the constituents of the filter unit described above may be utilized in conjunction with the filtration of water, the constituents of the filter unit may be varied dependent upon the particular filter characteristics desired for other fluids with which the invention is to be used. Also, it is to be understood that the mounting fitting or manifold may be mounted in any existing supply line and is not limited to a water supply line, such as that disclosed in conjunction with the water fountain of the drawings. Further, while only one filter attachment has been illustrated, the filter attachments may be mounted in series or a single elongated mounting fitting or manifold may be made to mount a plurality of filter units in series.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A filter attachment comprising a mounting fitting, said mounting fitting including an inlet connection and an outlet connection, a disposable cartridge releasably carried by said mounting fitting, said mounting fitting having a bore therethrough, a fastener passing through said bore and securing said cartridge to said mounting fitting, said cartridge having projecting inlet and outlet fittings releasably communicated with said inlet and outlet connections.

2. A filter attachment comprising a mounting fitting, said mounting fitting including an inlet connection and an outlet connection, a disposable cartridge releasably carried by said mounting fitting, said mounting fitting having a bore therethrough, a fastener passing through said bore and securing said cartridge to said mounting fitting, said cartridge having projecting inlet and outlet fittings releasably communicated with said inlet and outlet connections, a gasket disposed between said mounting fitting and said cartridge sealing said inlet and outlet fittings relative to said inlet and outlet connections.

3. A filter attachment comprising a mounting fitting, said mounting fitting including an inlet connection and an outlet connection for attachment to a supply line, said mounting fitting also including a filter inlet connection and a filter outlet connection, a disposable filter unit releasably carried by said mounting fitting, said disposable filter unit having projecting inlet and outlet fittings projecting into and releasably communicated with said mounting fitting filter inlet and outlet connections, and means releasably secured said filter unit to said mounting fitting.

4. A filter attachment for mounting a filter in a supply line, said filter attachment comprising a manifold, inlet and outlet connections projecting in opposite directions from opposite sides of said manifold for attachment to a supply line, said manifold having an underside, a filter inlet connection opening through said underside and being communicated with said inlet connection, a filter outlet connection opening through said underside and being communicated with said outlet connection, said filter inlet connection and said filter oultet connection being disposed in parallel relation, a disposable filter unit depending from said manifold, a filter unit retaining bolt passing vertically through said manifold and being engaged with said filter unit to clamp said filter unit against said manifold, said disposable filter unit having projecting inlet and outlet fittings projecting into and releasably communicated with said manifold filter outlet and inlet connections, and sealing means sealing all of the connections between said disposable filter unit and said manifold.

References Cited in the file of this patent

UNITED STATES PATENTS

| | | |
|---|---|---|
| 1,985,162 | Gilles | Dec. 18, 1934 |
| 2,287,670 | Dever | June 23, 1942 |
| 2,605,901 | Morrison et al. | Aug. 5, 1952 |